(12) United States Patent
Kannan et al.

(10) Patent No.: US 10,865,159 B2
(45) Date of Patent: Dec. 15, 2020

(54) METHODS OF MANUFACTURE FOR COATED GRANULAR FERTILIZERS

(71) Applicant: SABIC Global Technologies B.V., Bergen op Zoom (NL)

(72) Inventors: Ganesh Kannan, Sugar Land, TX (US); Christina Posada, Houston, TX (US); James Haigh, Sugar Land, TX (US); Sabeshan Kanagalingam, Riyadh (SA); Travis Harper, Houston, TX (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 308 days.

(21) Appl. No.: 15/776,260

(22) PCT Filed: Nov. 11, 2016

(86) PCT No.: PCT/US2016/061487
§ 371 (c)(1),
(2) Date: May 15, 2018

(87) PCT Pub. No.: WO2017/087265
PCT Pub. Date: May 26, 2017

(65) Prior Publication Data
US 2020/0247727 A1    Aug. 6, 2020

Related U.S. Application Data

(60) Provisional application No. 62/415,762, filed on Nov. 1, 2016, provisional application No. 62/255,681, filed on Nov. 16, 2015.

(51) Int. Cl.
*C05C 9/00* (2006.01)
*C05G 5/30* (2020.01)
(Continued)

(52) U.S. Cl.
CPC .............. *C05G 5/37* (2020.02); *C05C 9/005* (2013.01); *C05G 3/20* (2020.02); *C05G 3/40* (2020.02); *C05G 5/12* (2020.02); *C05G 5/38* (2020.02)

(58) Field of Classification Search
None
See application file for complete search history.

(56) References Cited

U.S. PATENT DOCUMENTS 3,056,723 A    10/1962   Galloway
3,232,740 A     2/1966   Sor et al.
(Continued)

FOREIGN PATENT DOCUMENTS

AU          667645      2/1995
AU       2015212412     9/2016
(Continued)

OTHER PUBLICATIONS

U.S. Appl. No. 62/493,952, filed Jul. 21, 2016 to Achille et al.*
(Continued)

*Primary Examiner* — Wayne A Langel
(74) *Attorney, Agent, or Firm* — Norton Rose Fulbright US LLP (57) ABSTRACT

A process of manufacturing a coated fertilizer comprising: providing at least partially coated fertilizer granules having an at least partial coating comprising a polymer and a wax; and conditioning the at least partially coated fertilizer granules at a temperature of 40 to 130° C. for a time of 1 minute to 4 hours, to form a coating comprising interpenetrating domains comprising polymer domains and wax domains.

19 Claims, 1 Drawing Sheet

(51) Int. Cl.
  *C05G 5/12* (2020.01)
  *C05G 3/20* (2020.01)
  *C05G 3/40* (2020.01)

(56) References Cited

U.S. PATENT DOCUMENTS

| | | | |
|---|---|---|---|
| 3,300,294 A * | 1/1967 | Hollstein | C05G 5/37 71/28 |
| 3,314,778 A | 4/1967 | Campbell et al. | |
| 3,322,528 A | 5/1967 | Hamamoto | |
| 3,326,665 A | 6/1967 | Schäfer et al. | |
| 3,331,677 A | 7/1967 | Campbell et al. | |
| 3,388,989 A | 6/1968 | Sor | |
| 3,400,011 A * | 9/1968 | Fox | C05G 5/37 427/220 |
| 3,441,539 A | 4/1969 | Schafer et al. | |
| 3,499,748 A | 3/1970 | Fraser | |
| 3,825,414 A | 6/1974 | Lee et al. | |
| 3,870,755 A | 3/1975 | Kamo et al. | |
| 3,954,436 A | 5/1976 | Vad et al. | |
| 3,961,329 A | 7/1976 | Naidich | |
| 3,962,329 A | 7/1976 | Schoenaich et al. | |
| 4,062,890 A | 12/1977 | Shank | |
| 4,082,533 A * | 4/1978 | Wittenbrook | C05G 5/37 71/28 |
| 4,880,455 A | 11/1989 | Blank | |
| 4,994,100 A | 2/1991 | Sutton et al. | |
| 5,124,451 A | 7/1992 | Hackl et al. | |
| 5,169,954 A | 12/1992 | Hackl et al. | |
| 5,219,465 A * | 6/1993 | Goertz | C05C 9/005 71/28 |
| 5,264,019 A | 11/1993 | Gossett, Jr. et al. | |
| 5,300,135 A * | 4/1994 | Hudson | C05G 5/36 71/28 |
| 5,352,265 A | 10/1994 | Weston et al. | |
| 5,399,186 A | 3/1995 | Derrah et al. | |
| 5,405,426 A | 4/1995 | Timmons | |
| 5,414,083 A | 5/1995 | Hackl et al. | |
| 5,466,274 A | 11/1995 | Hudson et al. | |
| 5,476,528 A | 12/1995 | Trimm | |
| 5,597,917 A | 1/1997 | Hackl et al. | |
| 5,645,624 A * | 7/1997 | Naka | C05G 5/37 71/64.07 |
| 5,741,521 A | 4/1998 | Knight et al. | |
| 5,803,946 A | 9/1998 | Petcavich | |
| 5,851,261 A | 12/1998 | Markusch et al. | |
| 5,862,610 A | 1/1999 | Lipert | |
| 5,917,110 A | 6/1999 | Kust | |
| 5,976,210 A | 11/1999 | Sensibaugh | |
| 6,048,376 A | 4/2000 | Miller | |
| 6,048,378 A | 4/2000 | Moore | |
| 6,231,633 B1 | 5/2001 | Hirano et al. | |
| 6,391,454 B1 | 5/2002 | Mao et al. | |
| 6,500,223 B1 | 12/2002 | Sakai et al. | |
| 6,576,035 B2 | 6/2003 | Hartmann et al. | |
| 6,749,659 B1 | 6/2004 | Yu et al. | |
| 6,900,162 B2 | 5/2005 | Wertz et al. | |
| 6,936,573 B2 | 8/2005 | Wertz et al. | |
| 6,936,681 B1 | 8/2005 | Wertz et al. | |
| 7,213,367 B2 | 5/2007 | Wertz et al. | |
| 8,163,058 B2 | 4/2012 | Whitehurst | |
| 8,419,819 B2 | 4/2013 | Sutton | |
| 8,603,211 B2 | 12/2013 | Rahn et al. | |
| 9,034,072 B2 | 5/2015 | Gabrielson et al. | |
| 9,376,350 B2 | 6/2016 | Pursell et al. | |
| 9,394,210 B2 | 7/2016 | Gabrielson et al. | |
| 9,422,203 B2 | 8/2016 | Waliwitiya | |
| 9,446,993 B2 | 9/2016 | Li et al. | |
| 2003/0224031 A1 | 12/2003 | Heier et al. | |
| 2004/0001884 A1 | 1/2004 | Moroni et al. | |
| 2004/0016275 A1 | 1/2004 | Hartmann et al. | |
| 2004/0016276 A1 * | 1/2004 | Wynnyk | C05G 5/37 71/64.11 |
| 2004/0050127 A1 | 3/2004 | Ambri | |
| 2004/0163434 A1 | 8/2004 | Quin | |
| 2004/0182953 A1 | 9/2004 | Knoer | |
| 2006/0089259 A1 | 4/2006 | Driessen et al. | |
| 2006/0142157 A1 | 6/2006 | Birthisel et al. | |
| 2009/0270257 A1 | 10/2009 | Pursell et al. | |
| 2010/0011825 A1 * | 1/2010 | Ogle | C05G 5/36 71/30 |
| 2010/0139348 A1 | 6/2010 | Wan et al. | |
| 2011/0036009 A1 | 2/2011 | Bissonnette et al. | |
| 2011/0275520 A1 | 11/2011 | Frey et al. | |
| 2012/0017659 A1 | 1/2012 | Pursell et al. | |
| 2012/0067094 A1 | 3/2012 | Pursell et al. | |
| 2012/0090366 A1 * | 4/2012 | Pursell | C05G 5/37 71/28 |
| 2013/0152649 A1 | 6/2013 | Kweeder et al. | |
| 2013/0231493 A1 | 9/2013 | Shishkov et al. | |
| 2014/0047884 A1 | 2/2014 | Gabrielson et al. | |
| 2014/0102156 A1 | 4/2014 | Pursell et al. | |
| 2014/0223978 A1 | 8/2014 | Kuo et al. | |
| 2014/0255605 A1 | 9/2014 | Kaathoven Van et al. | |
| 2015/0031786 A1 | 1/2015 | Lambeth | |
| 2015/0052960 A1 | 2/2015 | Makin et al. | |
| 2015/0101379 A1 | 4/2015 | Gabrielson et al. | |
| 2015/0152017 A1 | 6/2015 | Schumski et al. | |
| 2015/0197460 A1 | 7/2015 | Gabrielson et al. | |
| 2015/0291481 A1 * | 10/2015 | Neff | C09D 175/04 504/347 |
| 2016/0075609 A1 | 3/2016 | Gabrielson et al. | |
| 2016/0076062 A1 | 3/2016 | Medoff et al. | |
| 2016/0340265 A1 | 11/2016 | Kanagalingam et al. | |
| 2017/0088480 A1 | 3/2017 | Kannan et al. | |
| 2018/0022661 A1 * | 1/2018 | Achille | C09D 175/08 71/27 |
| 2018/0208513 A1 | 7/2018 | Kanagalingam et al. | |
| 2018/0297903 A1 | 10/2018 | Ledoux et al. | |

FOREIGN PATENT DOCUMENTS

| | | |
|---|---|---|
| CA | 2441175 | 3/2004 |
| CA | 2701995 | 10/2011 |
| CN | 1145059 | 3/1997 |
| CN | 1666972 | 9/2005 |
| CN | 1298679 C | 2/2007 |
| CN | 101037371 | 9/2007 |
| CN | 101134697 | 3/2008 |
| CN | 101177365 | 5/2008 |
| CN | 101289350 | 10/2008 |
| CN | 101289353 | 10/2008 |
| CN | 101323545 | 12/2008 |
| CN | 101723752 A | 6/2010 |
| CN | 102295491 | 12/2011 |
| CN | 102557838 | 7/2012 |
| CN | 102826917 | 12/2012 |
| CN | 102951968 A | 3/2013 |
| CN | 103319120 | 9/2013 |
| CN | 104177201 A | 12/2014 |
| CN | 104261723 | 1/2015 |
| CN | 104276877 A | 1/2015 |
| CN | 104311366 | 1/2015 |
| CN | 104326847 | 2/2015 |
| CN | 102936169 B | 4/2015 |
| DE | 1146080 | 3/1963 |
| DE | 1905834 | 11/1972 |
| DE | 142044 | 6/1980 |
| DE | 3042662 | 6/1982 |
| DE | 4128828 | 3/1993 |
| DE | 19631764 | 2/1998 |
| EP | 0047556 | 3/1982 |
| EP | 0255752 A2 | 2/1988 |
| EP | 0491238 | 6/1992 |
| EP | 0877722 | 11/1998 |
| EP | 1043295 A2 | 10/2000 |
| EP | 1067093 B1 | 12/2004 |
| EP | 1724247 | 11/2006 |
| EP | 2431346 | 3/2012 |
| FR | 893153 | 6/1944 |
| FR | 1356105 | 3/1964 |
| GB | 1212605 | 11/1970 |
| GB | 1435678 | 5/1976 |

(56) References Cited

FOREIGN PATENT DOCUMENTS

| | | |
|---|---|---|
| GB | 1535807 | 12/1978 |
| JP | H07-033576 | 2/1995 |
| JP | H11116798 A | 4/1999 |
| JP | H11263689 A | 9/1999 |
| JP | H11278973 | 10/1999 |
| JP | 2001294792 | 10/2001 |
| KR | 100974639 B1 | 8/2010 |
| NZ | 596113 | 8/2012 |
| TW | 1549926 | 9/2016 |
| WO | WO 1989/00079 | 1/1989 |
| WO | WO 1995/026942 | 10/1995 |
| WO | WO 1996/18591 | 6/1996 |
| WO | 03006399 A1 | 1/2003 |
| WO | WO 2003/066207 | 8/2003 |
| WO | WO 2004/047974 | 6/2004 |
| WO | WO 2004/098858 | 11/2004 |
| WO | WO 2005/075602 | 8/2005 |
| WO | WO 2006/044393 | 4/2006 |
| WO | 2007041234 A2 | 4/2007 |
| WO | WO 2007/041234 | 4/2007 |
| WO | WO 2007/086773 | 8/2007 |
| WO | WO 2013/017888 | 2/2013 |
| WO | WO 2013/019121 | 2/2013 |
| WO | WO 2013/121384 | 8/2013 |
| WO | WO 2014/189183 | 11/2014 |
| WO | WO 2015/001457 | 1/2015 |
| WO | WO 2015/114542 | 8/2015 |
| WO | 2015170217 A1 | 11/2015 |
| WO | WO 2016/091205 | 6/2016 |
| WO | WO 2016/107548 | 7/2016 |
| WO | WO 2016/186526 | 11/2016 |
| WO | WO 2017/013573 | 1/2017 |
| WO | WO 2017/081183 | 5/2017 |
| WO | WO 2017/087265 | 5/2017 |
| WO | WO 2017087264 | 5/2017 |
| WO | WO 2017/100507 | 6/2017 |
| WO | WO 2017/137902 | 8/2017 |
| WO | WO 2017/013572 | 10/2017 |
| WO | WO 2017/168288 | 10/2017 |
| WO | WO 2018/162533 | 9/2018 |
| WO | WO 2018/193344 | 10/2018 |
| WO | WO 2018/193345 | 10/2018 |
| WO | WO 2018/193358 | 10/2018 |
| WO | WO 2019/030671 | 2/2019 |
| ZA | 201105819 | 4/2012 |

OTHER PUBLICATIONS

Extended European Search Report Issued in EP Application No. 16866888.7 dated Jun. 13, 2019, 10 pages.
Babu et al., "Current Progress on bio-based polymers and their future trends"; Progress in Biomaterials 2013, 2:8; 16 pages.
Chinese Patent No. 101723752; Date of Publication: Jun. 9, 2010; Abstract Only, 1 page.
Chinese Patent No. 102936169; Date of Publication: Apr. 22, 2015; Abstract Only, 1 page.
Chinese Patent No. 102951968; Date of Publication: Mar. 6, 2013; Abstract Only, 1 page.
Chinese Patent No. 104177201; Date of Publication: Dec. 3, 2014; Abstract Only, 1 page.
Chinese Patent No. 104276877; Date of Publication: Jan. 14, 2015; Abstract Only, 1 page.
Chinese Patent No. 1298679; Date of Publication: Feb. 7, 2007; Abstract Only, 1 page.
International Search Report for International Application No. PCT/US2016/061487; dated Jan. 5, 2017; 10 pages.
Japanese Patent No. H11116798; Date of Publication: Apr. 27, 1999; Abstract Only, 1 page.
Korean Patent No. 100974639; Date of Publication: Aug. 9, 2010; Abstract Only, 1 page.
Written Opinion of the International Search Report for International Application No. PCT/US2016/061487; dated Jan. 5, 2017; 5 pages.
Babar Azeem et al., "Review on materials & methods to produce controlled release coated urea fertilizer"; Journal of Controlled Release, 2014, vol. 181, pp. 11-21.
Lubkowski, Krzysztof; "Coating Fertilizer Granules with Biodegradable Materials for Controlled Fertilizer Release"; Environmental Engineering and Management Journal, 2014, vol. 13, pp. 2573-2581
Al-Kanani et al., "Volatilization of ammonia from urea-ammonium nitrate solutions as influenced by organic and inorganic additives." Fertilizer research 1990, 23, 113-119.
Bose, et al., "New protocol for Biginelli reaction—a practical synthesis of Monastrol," ARKIVOC, 2005, 3:228-236.
Gautney, et al., "Feasibility of cogranulating the nitrogen loss inhibitors dicyandiamide, thiourea, phenyl phosphorodiamidate, and potassium ethyl xanthate with urea," *Ind. Eng. Chem. Prod. Res. Dev.*, 1984, 23:483-489.
Gioacchini, et al., "Influence of urease and nitrification inhibitors on N losses from soils fertilized with urea," *Biology and Fertility of Soils*, 2002, 36(2):129-135.
International Preliminary Report on Patentability issued in counterpart International Patent Application No. PCT/IB2015/050654, dated Aug. 2, 2016.
International Search Report and Written Opinion issued in counterpart International Patent Application No. PCT/IB2015/050654, dated May 19, 2015.
International Search Report and Written opinion issued in International Application No. PCT/IB2018/052577, dated Aug. 1, 2018.
International Search Report and Written opinion issued in International Application No. PCT/IB2018/052578, dated Aug. 1, 2018.
International Search Report and Written opinion issued in International Application No. PCT/IB2018/052630, dated Aug. 9, 2018.
International Search Report and Written opinion issued in International Application No. PCT/IB2018/055946, dated Dec. 3, 2018.
International Search Report and Written opinion issued in International Application No. PCT/IB2017/050683, dated Jun. 20, 2017.
Kawakami, et al., "Physiological and yield responses of field-grown cotton to application of urea with the urease inhibitor NBPT and the nitrification inhibitor DCD," *European Journal of Agronomy*, 2012, 43:147-154.
Lunt, et al., "Properties and Value of 1,1-Diureido Isobutane (IBDU) as a Long-Lasting Nitrogen Fertilizer," *J. Agr. Food Chem.*, 1969, 17(6):1269-1271.
Office Action issued in corresponding Chinese Patent Application No. 201580008733.2, dated Jan. 11, 2019. (Machine Translation Provided).
Office Action issued in corresponding Chinese Patent Application No. 2015800087332, dated Jun. 13, 2019.
Office Action issued in corresponding Indian Patent Application No. 201617028561, dated Jun. 18, 2019.
Office Action issued in corresponding Taiwanese Patent Application No. 105122936, dated Sep. 5, 2019.
Patra, et al. ,"Use of urea coated with natural products to inhibit urea hydrolysis and nitrification in soil," *Biol. Fertil. Soils*, 2009, 45:617-621.
Reddy, et al., New environmentally friendly solvent free syntehesis of dihydropyrimidinones catalysed by N-butyl-N, N-dimethyl-phenylethylammonium bromide, *Tetrahedron Letters*, 2003, 44:8173-8175.
Sanz-Cobena, et al., "Gaseous emissions of N2O and NO and NO3—leaching from urea applied with urease and nitrification inhibitors to a maize (*Zea mays*) crop," *Agriculture, Ecosystems & Environment*, 2012, 149:64-73.
Soares, et al., "Ammonia volatilization losses from surface-applied urea with urease and nitrification inhibitors," *Soil Biology and Biochemistry*, 2012, 52:82-89.
Trenkel, "Controlled-release and stabilized fertilizers in agriculture." *International fertilizer industry association* 1997, 11:1-156.
Upadhyay, "Urease inhibitors: A review." *Indian Journal of Biotechnology* 2012, 11:381-388.
Watson, et al., "Rate and mode of application of the urease inhibitor N-(n-butyl) thiophosphoric triamide on ammonia volatilization from surface-applied urea," *Soil Use and Management*, 2008, 24:246-253.

(56) References Cited

OTHER PUBLICATIONS

Zaman, et al., "Improving pasture growth and urea efficiency using N inhibitor, molybdenum and elemental Sulphur," *Journal of Soil Science and Plant Nutrition*, 2014, 14(1):245-257.

Zaman, et al., "Effects of urease and nitrification inhibitors on the efficient use of urea for pastoral systems," *J. Soil Science and Plant Nutrition*, 2013, 59(4):649-659.

Allison, "The Enigma of Soil Nitrogen Balance Sheets," *Adv. Agro.*, 1995, 7:213.

Al-Zahrani, "Utilization of Polyethylene and Paraffin Waxes as Controlled delivery Systems for Different Fertilizers," *Ind. Eng. Chem. Res.*, 2000, 39(2):367-371.

Bolan et al. "Soil Acidification and Liming interactions with Nutrient and Heavy Metal Transformation and Bioavailability," *Advances in Agronomy*, 2003, 78:215.

Chien et al. "Recent Developments of Fertilizer Production and Use to Improve Nutrient Efficiency and Minimize Environmental Impacts," *Adv. Agro.*, 2009, 102:267.

Ciurli et al., "Structural properties of the nickel irons in urease: novel insights into the catalytic and inhibition mechanisms," *Coord. Chem. Rev.*, 1999, 190-192:331.

Hays, "Symposium on Controlled-Release Fertilizers," *J. Agri. Food Chem.*, 1971, 19:797.

International Preliminary Report on Patentability issued in International Application No. PCT/IB2016/054271, dated Oct. 18, 2017.

International Search Report and Written Opinion issued in counterpart International Application No. PCT/IB2015/053056, dated Sep. 23, 2015.

International Search Report and Written Opinion issued in International Patent Application No. PCT/US2016/061486, dated Jan. 5, 2017.

International Search Report and Written Opinion issued in International Application No. PCT/IB2016/054271, dated Oct. 20, 2016.

International Search Report and Written Opinion issued in International Patent Application No. PCT/IB2016/054270, dated Oct. 24, 2016.

Jarosiewicz & Tomaszewska, "Controlled-release NPK fertilizer encapsulated by polymeric membranes," *Journal of Agricultural and Food Chemistry*, 2003, 51(2):413-417.

Mahmood et al. "Calcium Carbide-Based Formulations cause Slow Release of Acetylene and Ethylene in Soil and Nitrification Inhibition," *Communication in Soil Science and Plant Analysis*, 2014, 45(17):2277-2288.

Mahmood et al. "Effect of rate and application depth matrix-I calcium carbide based formulation on growth, yield and nitrogen uptake of wheat," *African Journal of Agricultural Research*, 2011, 6(30), 6363-6398.

Mahmood et al. "Nutritional and physiological response of wheat to soil applied matrix-I formulated calcium carbide with and without nitrogen fertilizer," *Pakistan Journal of Nutrition*, 2012, 11(2):154-159.

Office Action and Search Report issued in Corresponding Taiwanese Patent Application No. 104114189, dated May 9, 2019.

Office Action issued in corresponding Chinese Patent Application No. 201680051745.8, dated Jul. 23, 2019.

Office Action issued in counterpart Chinese Patent Application No. 201680066528.6, dated Aug. 5, 2020.

Office Action issued in European Patent Application No. 16741394.7, dated Dec. 7, 2018.

Search Report issued in corresponding Chinese Patent Application No. 201680051745.8, dated Jul. 2, 2019.

Sinclair et al. "Radiation use Efficiency," *Advances in Agronomy*, 1999, 65:215-265.

Subbarao et al. "Scope and Strategies for Regulation of Nitrification in Agricultural Systems—Challenges and Opportunities," *Crit Rev. Plant Sci.*, 2006, 25:303.

Wu, et al., "Guidelines for the Use of Fertilizers," *Chinese Agricultural Press*, 2000, 122-123. (English Translation).

* cited by examiner

METHODS OF MANUFACTURE FOR COATED GRANULAR FERTILIZERS

CROSS REFERENCE TO RELATED APPLICATIONS

This application is a 371 of International Application No. PCT/US2016/061487, filed Nov. 11, 2016, which claims priority to U.S. Application No. 62/415,762, filed Nov. 1, 2016 and U.S. Application No. 62/255,681, filed Nov. 16, 2015, all of which are incorporated herein by reference in their entirety.

BACKGROUND

Granular fertilizers can be coated to reduce dust production and to slow the release of nutrients into the soil. To improve fertilizer uptake by the plant, the available fertilizer concentration in the soil should match the plant growth need. Due to various parameters such as soil erosion, volatilization of ammonia, and leaching of nitrates, only about 40% of currently available fertilizers like urea are absorbed by the plant and the remainder is lost to the environment. Hence, there remains a need in the art for improved coated fertilizer which allows for a higher utilization of the fertilizer by the plant.

SUMMARY

Described herein is a process of manufacturing a coated fertilizer comprising: providing at least partially coated fertilizer granules having an at least partial coating comprising a polymer and a wax; and conditioning the at least partially coated fertilizer granules at a temperature of 40 to 130° C. for a time of 1 minute to 4 hours, to form a coating comprising interpenetrating domains comprising polymer domains and wax domains.

The above described and other features are further set forth in the following figures, detailed description, and claims.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

At least partially coated fertilizer granules having an at least partial coating comprising a polymer and a wax are conditioned at a temperature of 40 to 130° C. for a time of 1 minute to 4 hours, to form a coating comprising interpenetrating domains comprising polymer domains and wax domains. Within the aforementioned range the conditioning temperature can be 50 to 110° C., 60 to 100° C., or 60 to 80° C. Within the aforementioned time period the granules can be conditioned for a time of 2 to 4 hours.

The embodiments described herein relate to a coated fertilizer granule. The coating comprises interpenetrating domains of at least one polymer and at least one wax. The fertilizer granule is at least partially coated with a coating that comprises interpenetrating domains of at least one polymer and at least one wax.

It is desirable to improve the mechanical strength of the at least partially coated fertilizer granules. Mechanical strength can affect the ability of the fertilizer granules to withstand the normal handling procedures and can increase the effectiveness of the coating. It has surprisingly been discovered that pre-treating a surface of the fertilizer granule before applying the coating can improve the mechanical properties of the at least partially coated fertilizer granules as well as can improve the adherence of the coating to the fertilizer granule. The pre-treating, among other things, can include smoothing a surface of the fertilizer granule. Coated fertilizers containing a pre-treated fertilizer granule can have a significantly lower percent nitrogen release after 7 days as compared to coated fertilizers not containing a pre-treated fertilizer granule. For example, the pre-treated fertilizer granule can have a percent nitrogen release after 7 days of less than or equal to 70%, for example, less than or equal to 65%, for example, less than or equal to 60%. Pre-treatment can include smoothing of the fertilizer granule surface by pre-heating the granule to a temperature greater than or equal to 90° C. For example, the temperature can be greater than or equal to 100° C., for example, greater than or equal to 105° C., for example, greater than or equal to 125° C. The pre-treatment time can be greater than or equal to 5 hours, for example, greater than or equal to 10 hours, for example, greater than or equal to 15 hours, for example, greater than or equal to 20 hours.

After a coating has been applied (e.g. a 2% coating), the coated fertilizer containing the pre-treated fertilizer granule can be post-treated and weight loss measured. The 2% coating generally refers to a 2% polymer coating by weight. The coating can be applied by the processes described herein and gives a control sample allowing observation of the effect of the pre-treatment. Weight loss can be less for coated fertilizers containing the pre-treated fertilizer granule as compared to coated fertilizers not containing the pre-treated fertilizer granule. Post-treatment can include heating the pre-treated, at least partially coated granules at various temperatures and then measuring percent weight loss. Heating can include temperatures greater than or equal to 50° C., for example, greater than or equal to 60° C., for example, greater than or equal to 70° C., for example, greater than or equal to 80° C., for example, greater than or equal to 90° C., for example, greater than or equal to 100° C. The post-treatment heating time can be greater than or equal to 5 hours, for example, greater than or equal to 10 hours, for example, greater than or equal to 15 hours, for example, greater than or equal to 20 hours. The coated fertilizer containing the pre-treated fertilizer granule can have a percent weight loss of less than or equal to 0.20% after post-treatment, for example, less than or equal to 0.15%, for example, less than or equal to 0.10%.

The process disclosed herein can include pre-treating the fertilizer granule before the coating is applied. Pre-treating the fertilizer granule can assist in providing greater adherence of the coating to the fertilizer granule and in improving the ability of the coated fertilizer to withstand post formation tests as previously described herein. Pre-treating the fertilizer granule can include smoothing the surface of the fertilizer granule.

Smoothing the plurality of fertilizer granules can be achieved by heating, e.g., heating in a rotating drum or fluid bed. It is further contemplated that mechanical methods such as ball milling could also be used to smooth the plurality of fertilizer granules. In an exemplary method, a plurality of fertilizer granules are heated to a temperature greater than or equal to 90° C. for less than or equal to 15 hours. The temperature can be less than or equal to 110° C. For example, the temperature can be 90° C. to 100° C., or 100° C. to 110° C. The time can be 1 hour to 5 hours, or 5 hours to 15 hours. The fertilizer granules can be heated in an oven, a forced air oven, disc dryer, paddle dryer, rotary dryer, conveyor dryer, fluid bed dryer, or a combination comprising at least one of the foregoing. Optionally, the fertilizer granules can be cooled before coating.

In some embodiments, the at least partial coating on the fertilizer granules can be formed by at least partially dissolving a first polymer and a first wax in a first solvent to form a first solution; at least partially dissolving a second polymer and a second wax in a second solvent to form a second solution, wherein the concentration of wax in the first solution is different from the concentration of wax in the second solution, and contacting the first solution and the second solution with a plurality of fertilizer granules. The first solvent and second solvent can be evaporated from the fertilizer granules at a temperature less than the conditioning temperature. The first solution, the second solution, or both can further comprise an additional polymer.

The first polymer and second polymer can be the same or different. The first wax and the second wax can be the same or different. The first solvent and the second solvent can be the same or different.

In some embodiments, the at least partial coating on the fertilizer granules can be formed by at least partially dissolving a first polymer and a first wax in a first solvent to form a first solution; at least partially dissolving a second polymer and a second wax in a second solvent to form a second solution, wherein the first polymer is different from the second polymer, the first solvent is different from the second solvent, or the first wax is different from the second wax; and contacting the first solution and the second solution with a plurality of fertilizer granules. The first solvent and second solvent can be evaporated from the fertilizer granules at a temperature less than the conditioning temperature. The first solution, the second solution, or both can further comprise an additional polymer.

The fertilizer granules can be pre-treated before the first solution and the second solution are contacted with the fertilizer granule. Pre-treating the fertilizer granule can assist in providing greater adherence of the first solution and/or the second solution to the fertilizer granule and in improving the ability of the coated fertilizer to withstand post formation tests as previously described herein. Pre-treating the fertilizer granule can include smoothing the surface of the fertilizer granule.

As used herein the term "at least partially dissolving" is inclusive of suspending a material in a solvent. It is also inclusive of forming an emulsion.

The coated fertilizer comprising a fertilizer granule and a coating comprising interpenetrating domains of polymer domains and wax domains has a release rate which more closely matches plant growth rate and as a result has a higher utilization rate than coated fertilizer without the interpenetrating domains. Interpenetrating domains, as used herein, describe domains of different materials which penetrate each other mutually creating a morphology demonstrating distinct domains of separate materials which border one or more domains of a different material. These domains may be irregular in shape. A useful visual analogy is puzzle pieces in which adjoining pieces are domains formed from different materials. Without being bound by theory it is believed that when the polymer is applied it forms a non-continuous coating of polymer domains on the granules and at least some of the gaps in the polymer domains are filled with wax domains when the wax is applied.

The fertilizer granules can comprise nitrogen, phosphorus, or potassium sources such as ammonium nitrate, ammonium sulfate, ammonium sulfate nitrate, calcium nitrate, calcium ammonium nitrate, urea, urea-formaldehyde, monoammonium phosphate ("MAP"), diammonium phosphate, polyphosphate compounds, phosphate rock, single superphosphate ("SSP"), triple super phosphate, potassium nitrate, potassium chloride, potassium sulfate ("SOP" or potash), or a combination comprising at least one of the foregoing. In some embodiments, the fertilizer granules comprise urea. The amounts of nitrogen, phosphorus, or potassium sources included in the final fertilizer granules depends on the intended end use, and can be 0 to 60 wt. % for each component, based on the total weight of the fertilizer granule.

Additionally, magnesium sulfate and a source of one or more trace elements, i.e., micronutrients can be included, for example boron, calcium, chlorine, cobalt, copper, iron, manganese, molybdenum, nickel, sodium, zinc, or a combination comprising at least one of the foregoing can be present. These nutrients may be supplied in elemental form or in the form of salts, for example as sulfates, nitrates, or halides. The amount of plant micronutrients depends on the intended end use and can be, for example, 0.1 to 5 weight percent (wt. %), based on the total weight of the fertilizer granule.

Fillers can further be present in the granule, for example bentonite, calcite, calcium oxide, calcium sulfate (anhydrous or hemihydrate), dolomite, talc, sand, or a combination comprising at least one of the foregoing fillers.

Other components of granular fertilizers can include, for example, surfactants, nucleation agents, recycled fertilizer particles, nucleating soil conditioners such as calcium carbonate, activated carbon, elemental sulfur, biocides such as pesticides, herbicides, or fungicides, wicking agents, wetting agents, heat stabilizers, adhesives such as cellulose, polyvinyl alcohols, fats, oils, gum arabics, vinylidene ultraviolet stabilizers, antioxidants, reducing agents, colorants, binders (i.e., organochlorides, zeins, gelatins, chitosan, polyethylene oxide polymers, and acrylamide polymers and copolymers), and the like, as well as combinations comprising at least one of the foregoing.

The fertilizer granules can have any shape or size desired for their intended use. In some embodiments the fertilizer granules are substantially spherical. The fertilizer granules have an average particle diameter of 1.0 to 4.0 millimeters (mm). Within this range the average particle diameter can be greater than or equal to 1.5, or greater than or equal to 2.0 mm. Also within this range the average particle diameter can be less than or equal to 3.5, or less than or equal to 3.0 mm. In some embodiments at least 90% by weight of the fertilizer granules have a particle diameter of 2.0 to 4.0 mm Particle diameter is determined according to "Size Analysis—Sieve Method" IFDC S-107 issued by International Fertilizer Development Center (IFDC) which is the most common and internationally approved method used to determine fertilizer particle size.

The coating on the fertilizer granule comprises interpenetrating domains comprising polymer domains and wax domains. The polymer domains have a rate of biodegradation which differs from the rate of biodegradation of the wax domains when subjected to the same conditions. When the polymer domains comprise two or more polymers, each polymer has a different rate of biodegradation when subjected to the same conditions.

In some embodiments the polymer domains comprise a biopolymer. Exemplary polymers include polysaccharides, polyesters, lignin, and combinations comprising at least one of the foregoing. Exemplary polysaccharides include cellulose acetate, cellulose triacetate, starch acetate, or a combination comprising at least one of the foregoing. Exemplary polyesters include poly(butylene succinate), poly(butylene adipate terephthalate), poly(lactic acid), poly(lactic acid-co-glycolic acid), poly(butylene succinate), poly(caprolactone), poly(glycolide), poly(hydroxybutyrate), poly(hydroxybutyrate-co-hydroxy valerate), or a combination comprising at least one of the foregoing.

The cellulose acetate can have a weight average molecular weight ($M_w$) of 25,000 to 120,000 grams per mol (g/mol), for example, 35,000 to 70,000 g/mol.

The cellulose triacetate can have a $M_w$ of 100,000 to 350,000 g/mol, for example, 125,000 to 300,000 g/mol, for example, 200,000 to 275,000 g/mol.

Starch acetate is a starch that has been acetylated to a degree of substitution (DS) of 1 to 3 with an acetyl value of 20% to 70%. As used herein, "acetyl value" refers to the weight percent (wt %) of acetic acid per unit measure of starch acetate. For example, an acetyl value of approximately 62.5 is equivalent to a DS of 3.0.

The poly(butylene succinate) (PBS) can have a $M_w$ of 70,000 to 160,000 g/mol. In some embodiments the poly (butylene succinate) can have an $M_w$ of 100,000 to 150,000 g/mol, for example, 120,000 to 140,000 g/mol. In some embodiments the poly(butylene succinate) can have a $M_w$ of 75,000 to 125,000 g/mol, for example, 90,000 to 110,000 g/mol.

The poly(butylene adipate-terephthalate) (ECOFLEX™) can have a weight average molecular weight ($M_w$) of 30,000 to 120,000 g/mol, for example, 50,000 to 100,000 g/mol.

The poly(lactic acid) (PLA) can have a weight average molecular weight ($M_w$) of 30,000 to 250,000 g/mol. The PLA can comprise recycled PLA, scrap PLA or a combination comprising at least one of the foregoing. In some embodiments the poly(lactic acid) can have a $M_w$ of 150,000 to 210,000 g/mol, for example, 175,000 to 190,000 g/mol. In some embodiments the poly(lactic acid) can have a $M_w$ of 30,000 to 70,000 g/mol, for example, 40,000 to 65,000 g/mol.

The poly(lactic acid-co-glycolic acid) can have a $M_w$ of 5,000 to 300,000 g/mol, for example, 10,000 to 250,000 g/mol, for example, 40,000 to 150,000 g/mol.

The poly(caprolactone) can have a $M_w$ of 500 to 80,000 g/mol, for example, 5,000 to 70,000 g/mol, for example, 15,000 to 60,000 g/mol.

The poly(glycolide) can have a $M_w$ of 500 to 60,000 g/mol, for example, 5,000 to 50,000 g/mol, for example, 20,000 to 40,000 g/mol.

The poly(hydroxybutyrate) can have a $M_w$ of 10,000 to 500,000 g/mol, for example, 30,000 to 400,000 g/mol, for example, 75,000 to 350,000 g/mol.

The poly(hydroxybutyrate-co-hydroxy valerate) can have a $M_w$ of 10,000 to 600,000 g/mol, for example, 30,000 to 500,000 g/mol, for example, 100,000 to 400,000 g/mol.

Lignin is a polymer of aromatic alcohols most commonly derived from wood. Lignin can be obtained by the Kraft process. Exemplary lignin includes Kraft lignin marketed under the name of INDULIN™ AT or PROTOBIND™ 1000.

In some embodiments, the polymer domains comprise at least two polymers. These polymers may be miscible so as to form a single domain together or may be immiscible and form separate polymer domains.

The coating comprises polymer domains in an amount of 50 to 80 wt %, based on the total weight of the coating.

The wax domains comprise a $C_5$-$C_{35}$ wax, polyethylene wax, mineral wax, biobased wax, shellac, or a combination comprising at least one of the foregoing. Waxes are liquid at 110 to 200° F. (43 to 95° C.). Exemplary waxes include natural petroleum waxes, including paraffin waxes (hard, crystalline, brittle waxes composed primarily of unbranched alkanes, typically having melting points of 48 to 70° C.), microcrystalline waxes (soft, amorphous, malleable waxes composed primarily of branched alkanes, typically having melting points of 54 to 95° C.), and fully refined paraffin waxes. Synthetic waxes can also be used, including polyethylene waxes having, for example, a degree of polymerization of 10 to 18 carbon atoms. Exemplary waxes that are commercially available include a petroleum wax, C30+ from Chevron Phillips Chemical (CP-Chem), 7089A, R-4408, and R-3053A available from International Group, Inc.

The coating comprises wax domains in an amount of 20 to 50 wt %, based on the total weight of the coating.

When coated on the fertilizer granules, the amount of the coating is less than or equal to 6 wt. %, for example, 0.1 to 6 wt. %, 0.5 to 5 wt. %, 2 to 5 wt. %, or 3 to 5 wt. %, based on the total weight of the coated fertilizer.

In any of the foregoing embodiments, the coatings can further comprise an adjuvant as known in the art, for example a colorant, an adhesion promoter, or a surfactant, provided that the adjuvant does not significantly adversely affect the desired properties of the coated fertilizer. For example, a surfactant can include a primary and secondary ($C_{16-30}$)alkylamine, a ($C_{16-30}$)fatty acid amide of a primary ($C_{16-30}$)alkylamine, or a ($C_{16-30}$)fatty acid ester of a ($C_{16-30}$)alkanol. Examples of the foregoing surfactants include cetyl amine, stearyl amine, arachidyl amine, behenyl amine, dicetyl amine, distearyl amine, diarachidyl amine, dibehenyl amine, di(hydrogenated tallow) amine, cetyl stearamide, stearyl stearamide, stearyl erucamide, erucyl erucamide.

Further, in any of the foregoing embodiments, the coating is disposed directly on the granule or other layers, that is, no intervening layers are present other than those described. The coating can be continuous or discontinuous. To optimize the sustained release features of the coated fertilizer, the coating covers 90 to 100% of the surface area of the fertilizer granule.

The thickness of the coating is adjusted to provide the desired sustained release and protection properties. In some embodiments, the total thickness of the coating is 20 to 70 micrometers. For example, the thickness can be greater than or equal to 25, or greater than or equal to 30 micrometers. For example, the thickness can be less than or equal to 65, or less than or equal to 60 micrometers.

Contacting the coating composition with a plurality of fertilizer granules can be achieved by spray coating (for example, top, bottom, or side spray coating), drum coating, pan coating, fluid bed coating, continuous pour coating, or any other method known to those of skill in the art. This coating can be done in a batch or in a continuous process. The granules can be coated with a single layer in a single coating application, or the granules can be coated with multiple layers of the same coating material, such as, 2, 3, 4, 5, or more layers. Evaporating and heating the at least partially coated fertilizer granules can occur in the same step or in sequential steps. Exemplary devices include a rotary evaporator, an oven, or the like.

Exemplary solvents include chloroform, toluene, methylene chloride, or a combination comprising one or more of the foregoing.

In some embodiments, the conditioning temperature is 70 to 100% of the melting temperature of the wax.

It is also contemplated that the coated fertilizer described herein may be mixed with uncoated fertilizer granules or with a coated fertilizer having a coating comprising a polymer but free of wax.

In use, the coated fertilizer is applied to the locus of a plant or seed, in particular the soil of a plant or seed to be fertilized.

The coated fertilizers having sustained release properties are further illustrated by the following non-limiting examples.

EXAMPLES

The materials used in Example 1 are described in Table 1.

TABLE 1

| Component | Chemical Description | Source |
| --- | --- | --- |
| PBS | Poly(butylene succinate) 18127 | Danimer |
| PLA | Poly(lactic acid) 2003D | Natureworks |

TABLE 1-continued

| Component | Chemical Description | Source |
| --- | --- | --- |
| C30+ | Alpha-olefin wax | Chevron Phillips |
| Methylene Chloride | | Aldrich |

General Procedures

Urea granulation. In urea granulation, seed particles, or recycled urea prills, are rotated through a central agglomeration tube via a high velocity air stream. A spray nozzle at the bottom of the agglomeration tube sprays urea melt onto the particles. Because the urea melt droplets are supplied at high velocities with air constantly passing through the granulator, the seeds are wetted and dried efficiently. As more urea melt is supplied by the spray nozzles, the urea particles grow in diameter and the process is concluded when the desired size has been achieved.

Preparation of coating formulations. Two coating solutions were made. The compositions of the coating solutions are shown in the tables below. Grams is abbreviated as "g" in the tables.

Coating procedure. The coating solutions were applied to the fertilizer granules using an air atomized spray in a rotating drum. The solvent was evaporated at 40-50° C. and the coated granules were then further conditioned using either a rotovap (20-30 revolutions per minute (rpm) for 20 minutes) or a drying oven under the conditions shown in the tables. The conditioned granules were tested for urea release.

Urea release test. The test is used to mimic a release profile of urea at 24 hours. 5 grams of coated granules were placed in 95 grams of deionized water at room temperature for the specified time period. The water was analyzed for nitrogen content at the end of the time period. Results are reported in percentage of total nitrogen and are shown in Tables 2 and 3. The urea release test gives information allowing for a calculation of how much urea is no longer bound by the coating. In Table 2, in Sample 1, 66.07% of the initial amount of coated urea used in the test has been released at the time of analysis without conditioning. Stated another way Sample 1 demonstrates that about 33.93% of the urea was still entrapped by the coating and gradually diffusing.

TABLE 2

| Sample # | Solution 1 | Solution 2 | No conditioning | Rotovap at 94° C. | Rotovap at 99° C. | Rotovap at 103° C. | Rotovap at 110° C. |
| --- | --- | --- | --- | --- | --- | --- | --- |
| 1 | 9 g PBS, 21 g PLA, 15 g C30+, 900 g methylene chloride | 9 g PBS, 21 g PLA, 30 g C30+, 900 g methylene chloride | 66.07% | 15.86% | 26.09% | 69.77% | 91.68% |

TABLE 3

| Sample # | Solution 1 | Solution 2 | No conditioning | 70° C. for 1 hour | 70° C. for 2 hours | 70° C. for 3 hours | 70° C. for 4 hours | 70° C. overnight |
| --- | --- | --- | --- | --- | --- | --- | --- | --- |
| 2 | 9 g PBS, 21 g PLA, 15 g | 9 g PBS A, 21 g PLA, 30 g | 43.59% | 17.97% | 5.98% | 7.97% | 7.90% | 58.03% |

TABLE 3-continued

| Sample # | Solution 1 | Solution 2 | No conditioning | 70° C. for 1 hour | 70° C. for 2 hours | 70° C. for 3 hours | 70° C. for 4 hours | 70° C. overnight |
|---|---|---|---|---|---|---|---|---|
| 3 | 12 g PBS, 18 g PLA, 15 g C30+, in 900 g methylene chloride | 12 g PBS, 18 g PLA, 30 g C30+, in 900 g methylene chloride | 35.67% | 23.79% | 19.95% | 19.92% | 13.85% | — |
| 4 | 15 g PBS, 15 g PLA, 15 g C30+, in 900 g methylene chloride | 15 g PBS, 15 g PLA, 30 g C30+, in 900 g methylene chloride | 29.81% | 19.92% | 11.91% | 11.77% | 19.81% | — |

Table 2 shows that conditioning in a rotary evaporator at temperatures less than 103° C. slows the release of nitrogen from the urea granule. Conditioning at temperatures of 103° C. and higher actually increased the nitrogen release at 24 hours compared to the granules that were not conditioned.

Table 3 shows that conditioning in an oven at 70° C. for 2 to 4 hours slows the release of nitrogen from the urea granule compared to granules that weren't conditioned, conditioned for 1 hour and conditioned overnight.

Example 2

The materials used in Example 2 are described in Table 4.

TABLE 4

| Component | Chemical Description | Source |
|---|---|---|
| PBS | Poly(butylene succinate) 1020MD | Showa Denko |
| PLA | Poly(lactic acid) 2003D | Natureworks |
| Chloroform | | Aldrich |
| Toluene | | Aldrich |
| Urea | Granular | SABIC |

Formulations for the coatings are shown in Table 5.

TABLE 5

| | Solution 1 | | | | Solution 2 | | | |
|---|---|---|---|---|---|---|---|---|
| Sample # | PLA (g) | PBS (g) | Chloroform (g) | Toluene (g) | PLA (g) | PBS (g) | Chloroform (g) | Toluene (g) |
| 9 | 21 | 9 | 630 | 270 | 9 | 21 | 630 | 270 |
| 10 | 21 | 9 | 630 | 270 | 9 | 21 | 630 | 270 |
| 11 | 21 | 9 | 450 | 450 | 9 | 21 | 450 | 450 |
| 12 | 21 | 9 | 450 | 450 | 9 | 21 | 450 | 450 |
| 13 | 21 | 9 | 0 | 900 | 9 | 21 | 0 | 900 |
| 14 | 21 | 9 | 450 | 450 | 9 | 21 | 450 | 450 |
| 15 | 21 | 9 | 450 | 450 | 9 | 21 | 450 | 450 |
| 16 | 21 | 9 | 450 | 450 | 9 | 21 | 450 | 450 |
| 17 | 21 | 9 | 450 | 450 | 9 | 21 | 450 | 450 |
| 18 | 21 | 9 | 450 | 450 | 9 | 21 | 450 | 450 |
| 19 | 21 | 9 | 450 | 450 | 9 | 21 | 450 | 450 |
| 20 | 21 | 9 | 450 | 450 | 9 | 21 | 450 | 450 |
| 21 | 21 | 9 | 450 | 450 | 9 | 21 | 450 | 450 |
| 22 | 21 | 9 | 450 | 450 | 9 | 21 | 450 | 450 |
| 23 | 21 | 9 | 450 | 450 | 9 | 21 | 450 | 450 |
| 24 | 21 | 9 | 450 | 450 | 9 | 21 | 450 | 450 |
| 25 | 21 | 9 | 450 | 450 | 9 | 21 | 450 | 450 |
| 26 | 21 | 9 | 450 | 450 | 9 | 21 | 450 | 450 |
| 27 | 21 | 9 | 450 | 450 | 9 | 21 | 450 | 450 |
| 28 | 21 | 9 | 450 | 450 | 9 | 21 | 450 | 450 |
| 29 | 21 | 9 | 450 | 450 | 9 | 21 | 450 | 450 |

The fertilizer granules were placed in a stainless steel pan, which was then placed in a forced-air convection oven set to a temperature of 90-110° C. for up to 15 hours. At different time intervals up to 15 hours, a small aliquot of approximately 5 grams of urea was collected and SEM images taken. FIGS. 1A-4B show the differences in the surface after pre-heating. After the urea was in the oven for a given time frame, the urea was then spray coated in a rotating drum with biopolymers that were dissolved in organic solvents. The solvent was evaporated, leaving behind the coating material on the surface of the fertilizer granule. Once the coating was deposited, the samples were again placed in a stainless steel pan and placed in a forced-air convection oven that is set to 70-90° C. for up to 15 hours to remove residual solvent that remains on the coated fertilizer granule. After a given time frame, approximately 5 grams of the coated fertilizer granule was placed in 95 grams of deionized water at room temperature (19-25° C.) and the percent nitrogen (% N) release was measured using a refractometer after 24 hours.

Additional samples from each batch were tested for abrasion resistance. The abrasion resistance tests consisted of placing a number of equally sized stainless steel balls and 100 ml of the coated fertilizer into a stainless steel drum having equally spaced flights. The drum was closed and then rotated at 30 revolutions per minute for 5 minutes. After 5 minutes, the stainless steel balls were separated from the coated fertilizer using a sieve at which point approximately 5 grams of the abraded coated urea was placed in 95 grams of deionized water at room temperature and the % N release was measured using a refractometer after 24 hours. Although described herein with respect to a force-air convection oven, other devices can be used, including, but not limited to, disc dryers, drum dryers, paddle dryers, rotary dryers, conveyor dryers, and/or fluid bed dryers.

Table 6 shows the % N release for before and after the abrasion test along with the pre- and post-heat treatment. Temperatures are listed in ° C. and time in hours.

TABLE 6

| | | | | | 1-Day % N Release | | |
|---|---|---|---|---|---|---|---|
| Sample # | Pre-Heat T | Pre-Heat Time | Post-Heat T | Post-Heat Time | Before Abrasion Test | After Abrasion Test | Before and After Δ |
| 9 | None | 0 | 70 | 15 | 21.06 | 55.49 | 34.43 |
| 10 | None | 0 | 70 | 15 | 28.04 | 51.13 | 23.09 |
| 11 | None | 0 | 70 | 15 | 16.12 | 40.23 | 24.11 |
| 12 | None | 0 | 70 | 15 | 11.31 | 25.31 | 14.00 |

TABLE 6-continued

| | | | | | 1-Day % N Release | | |
| Sample # | Pre-Heat T | Pre-Heat Time | Post-Heat T | Post-Heat Time | Before Abrasion Test | After Abrasion Test | Before and After Δ |
|---|---|---|---|---|---|---|---|
| 13 | None | 0 | 70 | 15 | 29.47 | 67.62 | 38.15 |
| 17 | None | 0 | 70 | 15 | 19.39 | 65.93 | 46.54 |
| 18 | None | 0 | 70 | 15 | 22.94 | 62.35 | 39.41 |
| 19 | 105 | 15 | 70 | 15 | 12.85 | 20.21 | 7.36 |
| 20 | 105 | 15 | 70 | 15 | 16.04 | 20.12 | 4.08 |
| 21 | 105 | 15 | 70 | 15 | 6.11 | 8.09 | 1.98 |
| 22 | 105 | 15 | 70 | 15 | 29.88 | 27.11 | −2.77 |
| 23 | 105 | 15 | 70 | 15 | 19.18 | 24.02 | 4.84 |
| 24 | 105 | 15 | 70 | 15 | 15.15 | 19.52 | 4.37 |
| 25 | 105 | 15 | 70 | 15 | 28.08 | 26.59 | −1.49 |

Figure 1A:
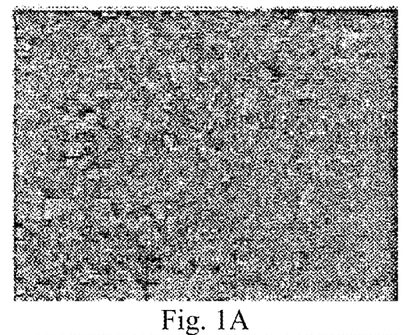
FIG. 1A is a scanning electron microscopic image of a sample at 500 times magnification with no pre-treatment.
Figure 1B:
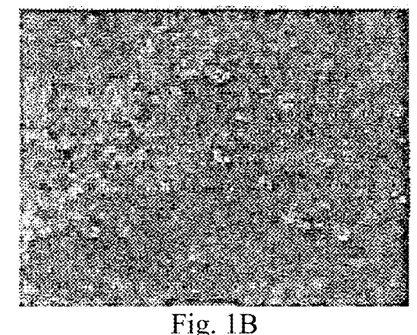
FIG. 1B is a scanning electron microscopic image of the sample of FIG. 1A at 2000 times magnification with no pre-treatment.
Figure 2A:
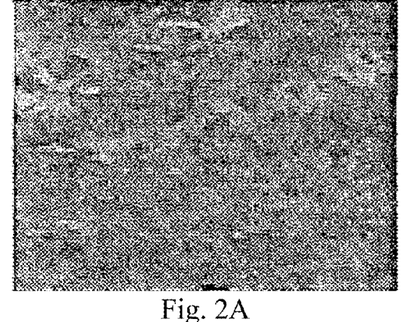
FIG. 2A is a scanning electron microscopic image of a sample at 500 times magnification with 5 hours of pre-treatment.
Figure 2B:
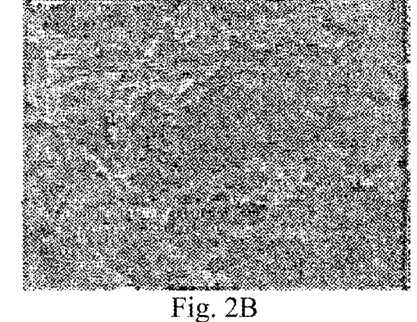
FIG. 2B is a scanning electron microscopic image of the sample of FIG. 2A at 2000 times magnification with 5 hours of pre-treatment.
Figure 3A:
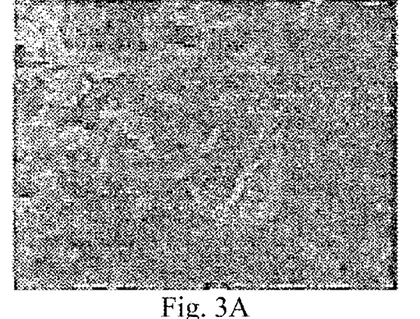
FIG. 3A is a scanning electron microscopic image of a sample at 500 times magnification with 10 hours of pre-treatment.
Figure 3B:
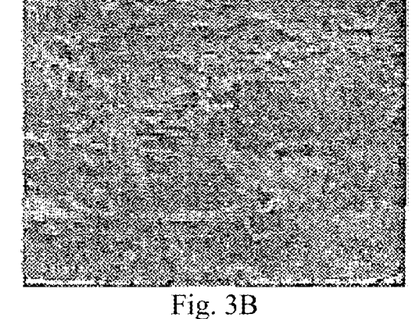
FIG. 3B is a scanning electron microscopic image of the sample of FIG. 3A at 2000 times magnification with 10 hours of pre-treatment.
Figure 4A:
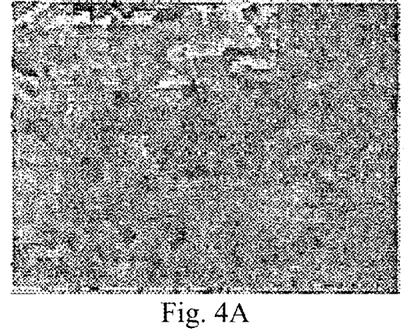
FIG. 4A is a scanning electron microscopic image of a sample at 500 times magnification with 15 hours of pre-treatment.
Figure 4B:
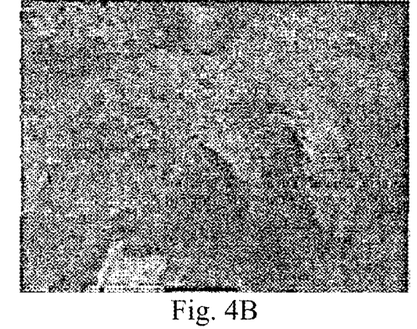
FIG. 4B is a scanning electron microscopic image of the sample of FIG. 4A at 2000 times magnification with 15 hours of pre-treatment.

As can be seen in FIGS. 1A-4B, the pre-treatment of a surface of the fertilizer granule provides a smoother surface of the fertilizer granule. FIGS. 1A, 2A, 3A, and 4 are at 500 times magnification, while FIGS. 1B, 2B, 3B, and 4B are at 2,000 times magnification. FIGS. 1A and 1B are the control sample with no pre-treatment. FIGS. 2A and 2B are a sample after pre-heating for 5 hours. FIGS. 3A and 3B are the sample in FIGS. 2A and 2B after pre-heating for 10 hours. FIGS. 4A and 4B are the sample in FIGS. 2A and 2B after pre-heating for 15 hours. As can be seen in the figures, a smoother surface is achieved with the longer heating. FIGS. 1A-4B further demonstrate that the surface morphology of the fertilizer granule undergoes transformation after it is heated in the forced-air convection oven. The sample in FIGS. 1A and 1B, which was not treated with heat, does not have a smooth surface compared to the samples that were heated for a period of time in FIGS. 2A-4B.

This transformation also appears to affect the % N release observed after the abrasion test after 34 hours as shown in Table 5. The % N release between the before abrasion and after abrasion test varies between 14.00% and 46.54% for samples that were not pre-heated. The % N release difference between samples that were pre-heated varies from no change to 7.36%.

The samples in Table 7 were also measured for % N release after 7 days and the percent weight loss after post-heat treatment.

TABLE 7

| | | | % N Release | | | | |
| Sample # | Pre-Heat T | Pre-Heat Time | 1 day | 7 days | Post-Heat T | Post-Heat Time | % Wt. Loss |
|---|---|---|---|---|---|---|---|
| 14 | None | 0 | 21.36 | 81.62 | 70 | 15 | 0.40 |
| 15 | None | 0 | 18.90 | 77.00 | 70 | 15 | 0.37 |
| 16 | None | 0 | 19.78 | 79.09 | 70 | 15 | 0.24 |
| 26 | 105 | 15 | 25.87 | 69.00 | 70 | 15 | 0.06 |
| 27 | 105 | 15 | 18.58 | 69.29 | 70 | 15 | 0.10 |
| 28 | 105 | 15 | 13.55 | 65.18 | 70 | 15 | 0.10 |
| 29 | 105 | 15 | 17.86 | 56.26 | 70 | 15 | 0.06 |

As shown in Table 7, the samples that were pre-heated had a significantly lower % N release after 7 days as compared to the non-pre-heated samples. Furthermore, the post-heated (i.e., dried) samples which contained the pre-heated fertilizer granules after a 2% coating was applied had a significantly lower % weight loss as compared to the post-heated samples without the pre-heated fertilizer granule.

Embodiment 1: A process of manufacturing a coated fertilizer, comprising: providing at least partially coated fertilizer granules having an at least partial coating comprising a polymer and a wax; and conditioning the at least partially coated fertilizer granules at a temperature of 40 to 130° C. for a time of 1 minute to 4 hours, to form a coating comprising interpenetrating domains comprising polymer domains and wax domains.

Embodiment 2: The process of Embodiment 1, wherein providing at least partially coated fertilizer granules comprises: at least partially dissolving a first polymer and a first wax in a first solvent to form a first solution; at least partially dissolving a second polymer and a second wax in a second solvent to form a second solution, wherein the concentration of wax in the first solution is different from the concentration of wax in the second solution; and contacting the first solution and the second solution with a plurality of fertilizer granules.

Embodiment 3: The process of Embodiment 2, wherein the first wax and the second wax are the same, the first polymer and the second polymer are the same and the first solvent and second solvent are the same.

Embodiment 4: The process of Embodiment 1, wherein providing at least partially coated fertilizer granules comprises: at least partially dissolving a first polymer and a first wax in a first solvent to form a first solution; at least partially dissolving a second polymer and a second wax in a second solvent to form a second solution, wherein the first polymer is different from the second polymer, the first solvent is different from the second solvent, or the first wax is different from the second wax; and contacting the first solution and the second solution with a plurality of fertilizer granules.

Embodiment 5: The process of any one of Embodiments 2 to 4, further comprising evaporating the first solvent and second solvent from the fertilizer granules after contacting them with the first solution and second solution at a temperature less than the conditioning temperature.

Embodiment 6: The process of any one of Embodiments 2 to 5, wherein the first solution, the second solution, or both further comprise an additional polymer.

Embodiment 7: The process of any one of Embodiments 1 to 6, wherein the conditioning temperature is 70 to 100% of the melting temperature of the first wax, second wax or both.

Embodiment 8: The process of any one of Embodiments 1 to 7, further comprising using a rotating drum to contact the coating on the fertilizer granule.

Embodiment 9: The process of any one of Embodiments 1 to 8, wherein the fertilizer granules comprise urea.

Embodiment 10: The process of any one of Embodiments 1 to 9, wherein the polymer domains comprise a biopolymer.

Embodiment 11: The process of Embodiment 10, wherein the biopolymer is a polysaccharide, a polyester, lignin or a combination comprising at least one of the foregoing.

Embodiment 12: The process of any of one of Embodiments 1 to 11, wherein the wax domains comprise a $C_5$-$C_{35}$ wax.

Embodiment 13: The process of any one of Embodiments 2 to 12, wherein the first solution and the second solution comprise the same polymers.

Embodiment 14: The process of Embodiment 13, wherein the polymers are in the same concentration.

Embodiment 15: The process of any one of Embodiments 1 to 14, wherein the first wax and the second wax are the same wax.

Embodiment 16: The process of any one of Embodiments 2 to 15, wherein the first solvent and the second solvent are the same.

Embodiment 17: A coating process of any one of Embodiments 1 to 16, further comprising: pre-treating the fertilizer granule with conditions effective to improve surface adherence properties to the coating to obtain a pre-treated fertilizer granule; and at least partially coating the pre-treated fertilizer granule.

Embodiment 18: The process of Embodiment 17, comprising pre-treating the fertilizer granule by heating to a temperature greater than or equal to 90° C., for a time period of greater than or equal to 5 hours.

Embodiment 19: The process of Embodiment 18, wherein the pre-treated fertilizer granule comprises a smoothed surface.

Embodiment 20: The process of any one of Embodiments 17 to 19, wherein the pre-treated fertilizer granule has a percent nitrogen release after 7 days of less than or equal to 70%, preferably, less than or equal to 65%, more preferably, less than or equal to 60%.

The singular forms "a," "an," and "the" include plural referents unless the context clearly dictates otherwise. "Or" means "and/or." The endpoints of all ranges directed to the same component or property are inclusive and independently combinable. The suffix "(s)" as used herein is intended to include both the singular and the plural of the term that it modifies, thereby including at least one of that term (e.g., "colorant(s)" includes at least one colorant). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. Substantially as described herein generally refers to greater than or equal to 75%, for example, greater than or equal to 75%, for example, greater than or equal to 95%.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A process of manufacturing a coated fertilizer comprising:
   pre-treating a fertilizer granule with conditions effective to improve surface adherence properties to a coating by heating the fertilizer granule to a temperature greater than or equal to 90° C. for a time period of greater than or equal to 1 hour, to obtain a pre-treated fertilizer granule;
   at least partially coating the pre-treated fertilizer granule to obtain an at least partially coated fertilizer granule, wherein the coating comprises a polymer and a wax; and
   conditioning the at least partially coated fertilizer granule at a temperature of 40 to 130° C. for a time of 1 minute to 4 hours, to form a conditioned coating comprising interpenetrating domains comprising polymer domains and wax domains.

2. The process of claim 1, wherein at least partially coating the pre-treated fertilizer granule comprises:
   at least partially dissolving a first polymer and a first wax in a first solvent to form a first solution;
   at least partially dissolving a second polymer and a second wax in a second solvent to form a second solution, wherein the concentration of wax in the first solution is different from the concentration of wax in the second solution; and
   contacting the first solution and the second solution with a plurality of fertilizer granules.

3. The process of claim 2, wherein the first wax and the second wax are the same, the first polymer and the second polymer are the same and the first solvent and second solvent are the same.

4. The process of claim 1, wherein at least partially coating the pre-treated fertilizer granule comprises:
   at least partially dissolving a first polymer and a first wax in a first solvent to form a first solution;
   at least partially dissolving a second polymer and a second wax in a second solvent to form a second solution, wherein the first polymer is different from the second polymer, the first solvent is different from the second solvent, or the first wax is different from the second wax; and
   contacting the first solution and the second solution with a plurality of fertilizer granules.

5. The process of claim 2, further comprising evaporating the first solvent and second solvent from the fertilizer granules after contacting them with the first solution and second solution at a temperature less than the conditioning temperature.

6. The process of claim 2, wherein the first solution, the second solution, or both further comprise an additional polymer.

7. The process of claim 1, wherein the conditioning temperature is 70 to 100% of the melting temperature of the first wax, second wax or both.

8. The process of claim 1, further comprising using a rotating drum to contact the coating on the fertilizer granule.

9. The process of claim 1, wherein the fertilizer granules comprise urea.

10. The process of claim 1, wherein the polymer domains comprise a biopolymer.

11. The process of claim 10, wherein the biopolymer is a polysaccharide, a polyester, lignin or a combination comprising at least one of the foregoing.

12. The process of claim 1, wherein the wax domains comprise a C5-C35 wax.

13. The process of claim 2, wherein the first solution and the second solution comprise the same polymers.

14. The process of claim 13, wherein the polymers are in the same concentration.

15. The process of claim 1, wherein the first wax and the second wax are the same wax.

16. The process of claim 1, wherein the first solvent and the second solvent are the same.

17. The process of claim 1, comprising pre-treating for a time period of greater than or equal to 5 hours.

18. The process of claim 1, wherein the pre-treated fertilizer granule comprises a smoothed surface.

19. The process of claim 1, wherein the pre-treated fertilizer granule has a percent nitrogen release after 7 days of less than or equal to 70%.

* * * * *